Patented May 23, 1933

1,910,871

UNITED STATES PATENT OFFICE

JOHANNES WICHERT, OF DONCASTER, ENGLAND, ASSIGNOR TO THE FIRM AMERICAN BEMBERG CORPORATION, OF NEW YORK, N. Y., A CORPORATION OF DELAWARE

PROCESS FOR WORKING UP THE WASTE LIQUORS OF THE CUPRAMMONIUM SILK STRETCH SPINNING PROCESS

No Drawing. Application filed March 31, 1931, Serial No. 526,780, and in Germany April 12, 1930.

It is already known in the production of cuprammonium silk to remove the copper from the usually alkaline precipitating liquid by introducing carbohydrates, cellulose or wood meal into the liquid. These substances have the property of absorbing copper from the liquid. After the completion of the absorption the copper precipitated on the substances is completely brought into solution again by means of acid and may then be re-used.

It is also known to recover the copper from the precipitating liquid used in the manufacture of cuprammonium silk by first of all expelling ammonia by suitable expedients and then precipitating out the copper as an insoluble compound, usually as oxide or hydroxide.

These known processes, however, have not led to a satisfactory result in the case of the precipitating liquid used in the production of cuprammonium silk according to the stretch spinning process, since in this process the copper occurs in extraordinarily great dilution. The absorptive properties of the substances mentioned in the introduction are no longer sufficient to remove copper from the solution with practical completeness. Similarly, the employment of the second process is out of the question since the vapourization of the ammonia, in view of the small concentration, is not economical enough.

The copper-containing waste liquors comprise the spent copper-containing and ammonia-containing precipitating liquid and the acid washing liquors of the freshly spun artificial silk. Another portion of the copper is in the usually acid hardening liquid.

The copper is present in the waste liquors at a concentration of about 0.01%, so that heretofore its obtention by the known processes was uneconomical. What makes things more difficult is the fact that cellulose derivatives are dissolved in the waste liquors also, which, as protective colloids, counteract the precipitation of the copper.

The present invention has for its object in the first place as complete a recovery as possible of the copper from the highly diluted precipitating liquid. The invention further has for its object to use herefor to the maximum possible extent the other waste liquors, such as are produced during the acidification of the finished spun filament. Finally it is possible according to the invention to use the auxiliary substance employed in cyclic circulation.

The invention consists in this, that the copper-containing waste liquors are treated with a salt solution of trivalent metals, preferably with aluminium or ferric salts. The added salt in the solution reacts with the ammonia present in the waste liquor in such a way that ammonium salt and a precipitate of hydroxide of the trivalent metal, that is, for example, of ferric hydroxide, are formed. By the binding of the ammonia to the acid residue of the added salt the conditions for a genuine solution of copper also are removed. This copper, favoured by the dissolved cellulose degradation bodies, would form very stable colloidal solutions were it not that the precipitated metal hydroxide carries down with it both the copper as well as the stabilizers.

The precipitate so formed is separated from the supernatant liquor by separation or filtration, which liquor essentially contains ammonium sulphate, small quantities of free ammonia as well as traces of the trivalent metal and copper.

The precipitate consisting of the hydroxides of copper and the trivalent metal is now stirred up with so much acid, preferably sulphuric acid, that the copper hydroxide is dissolved up as copper sulphate; if ferric salt is used for the precipitation the precipitate consisting of ferric hydroxide is partly converted into basic iron sulphate, but remains undissolved with the exception of traces.

Furthermore, there is the additional advantage that the cellulose degradation bodies do not go up into solution during the dissolution of the copper. Thus a solution of copper salt is obtained which contains metallic impurities to the extent of only a few tenths per thousand; the amount of iron may be diminished still further by the addition of small quantities of soda. The copper salt solution is so pure that it may be used again without any further preliminary for the precipitation of the cellulose solution.

For the dissolution of the precipitate the spent copper-containing acid hardening liquid may be used.

The mud of trivalent metal hydroxide remaining behind is now dissolved up with the requisite quantity of further acid, preferably again sulphuric acid, as a result of which the organic impurities remain undissolved and may be separated by settling or filtering off. The solution of trivalent salt may then be used again for precipitating copper. In this way a complete cycle is enabled to occur.

Spent copper-containing sulphuric acid, such as is obtained in the hardening of the filaments, may also be used for the dissolution of the sludge of trivalent metal hydroxide. It is immaterial that copper is dissolved in this liquid for this is recovered as soon as the salt of the trivalent metal produced from the mud is again used in the cycle for precipitating the copper in the waste liquors.

The process may be illustrated by the following example of the method of carrying it out:

In 1000 cubic metres of spent precipitating liquor there are, besides ammonia, 80 kg. of copper. To this are added the copper-containing acid waste liquors which are also obtained otherwise, such as are produced, for example, during the washing of the acidified artificial silk. In this way a part of the ammonia in the precipitating liquid is neutralized. To this solution are continuously added 20 cubic metres of a solution which contains 1% of trivalent iron and about 0.25% of free sulphuric acid. There is also about 0.5% of copper in this solution, the presence of which is explained by the production of the solution by using the copper-containing sulphuric acid formed during the hardening of artificial filaments. Five thousand kilograms of a mud precipitate out of the waste liquors, which is a mixture of iron and copper hydroxide and may be pressed off in filter presses. The mud contains about 4% copper and 4% of iron. This mud is stirred up at ordinary temperature with 5 cubic metres of the copper-containing sulphuric acid which occurs as waste during the hardening and which has a content of 2.5% sulphuric acid and 0.4% copper, together with 350 kg. of sulphuric acid of 60° Bé. The copper hydroxide dissolves up in the form of copper sulphate whilst the iron hydroxide is partially converted into insoluble basic sulphate. The copper sulphate solution is separated from the residue by filtration. The solution obtained in this way contains only 0.02% iron, which may be diminished to 0.0025% by addition of some soda solution and stirring. This copper sulphate solution may be converted into basic copper sulphate without any further preliminary by addition of excess soda solution; the basic copper sulphate obtained may be used anew for adding to the spinning solution.

The quantity of iron-containing mud filtered off amounts to 1700 kg. and contains 12% iron and 1% copper. The mud is dissolved with a further 20 cubic metres of spent hardening liquid and 60 kg. of concentrated sulphuric acid. Since the main quantity of the copper is now removed, the organic impurities remain undissolved and may be readily filtered off. The ferric sulphate solution so obtained is now adjusted to the initial concentration and used again.

What I claim is:

1. In a process for separating copper from the waste liquors of low copper concentration which are obtained in the cuprammonium stretch-spinning process, the steps of treating the liquid with a solution of a salt of a trivalent metal and separating the copper containing hydroxide mud from the supernatant liquor.

2. In a process for separating copper from the waste liquors of low copper concentration which are obtained in the cuprammonium stretch-spinning process, the steps of treating the liquid with a solution of a salt of a trivalent metal, separating the copper containing precipitate from the supernatant liquor and working up the precipitate to pure copper salts.

3. In a process for separating copper from the waste liquors of low copper concentration which are obtained in the cuprammonium stretch-spinning process, the steps of treating the liquid with a solution of a salt of a trivalent metal, separating the copper containing precipitate from the supernatant liquor and treating this precipitant by fractional dissolution with acid.

4. In a process for separating copper from the waste liquors of low copper concentration which are obtained in the cuprammonium stretch-spinning process, the steps of treating the liquid with a solution of a salt of a trivalent metal, separating the copper containing mud from the supernatant liquor and treating said mud with a quantity of acid correspondent to the amount of copper present in the mud.

5. In a process for separating copper from the waste liquors of low copper concentration which are obtained in the cuprammonium stretch-spinning process, the steps of treating the liquid with a solution of a salt of a trivalent metal, separating the copper containing mud from the supernatant liquor dissolving with a correspondent acid quantity the copper present in the mud, separating the undissolved rest from the copper containing liquor, and treating said rest by another amount of acid correspondent to the amount of hydroxide of trivalent metal.

6. In a process for separating copper from the waste liquors of low copper concentration which are obtained in the cuprammonium stretch-spinning process, the steps of treating the liquid with a solution of a salt of a trivalent metal, separating the copper containing mud from the supernatant liquor and treating said mud by fractional dissolution with such quantities of acid corresponding to the amounts of copper-hydroxide and hydroxide of trivalent metal present in the mud.

7. In a process for separating copper from the waste liquors of low copper concentration which are obtained in the cuprammonium stretch-spinning process, the steps of treating the liquid with a solution of a salt of a trivalent metal, separating the copper containing mud from the supernatant liquor and treating said mud by dissolution with the acid copper containing liquid which is formed during the hardening of the filaments.

8. In a process for separating copper from the waste liquors of low copper concentration which are obtained in the cuprammonium stretch-spinning process, the steps of treating the liquid with a solution of a salt of a trivalent metal, separating the copper containing mud from the supernatant liquor, dissolving with a correspondent acid quantity the copper present in the mud, separating the undissolved rest from the dissolved copper, dissolving said rest by another quantity of acid liquor, separating the undissolved organic impurities, and re-using the formed solution of salt of trivalent metal for treating low concentrated waste copper-containing liquors.

In testimony whereof I affix my signature.
JOHANNES WICHERT.